(12) United States Patent
Nguyen

(10) Patent No.: US 10,126,776 B1
(45) Date of Patent: Nov. 13, 2018

(54) ANTI-ACCOMMODATION PARESIS APPARATUS

(71) Applicant: Andrew Nguyen, Huntington Beach, CA (US)

(72) Inventor: Andrew Nguyen, Huntington Beach, CA (US)

( * ) Notice: Subject to any disclaimer, the term of this patent is extended or adjusted under 35 U.S.C. 154(b) by 5 days.

(21) Appl. No.: 15/608,687

(22) Filed: May 30, 2017

Related U.S. Application Data

(63) Continuation-in-part of application No. 15/041,579, filed on Feb. 11, 2016, now Pat. No. 9,662,259.

(51) Int. Cl.

| | |
|---|---|
| *G06F 1/16* | (2006.01) |
| *F16M 11/20* | (2006.01) |
| *A47B 97/00* | (2006.01) |
| *A61H 5/00* | (2006.01) |
| *A61H 1/00* | (2006.01) |
| *G06F 3/01* | (2006.01) |
| *G06F 3/0362* | (2013.01) |
| *H02K 7/116* | (2006.01) |

(52) U.S. Cl.
CPC ............ *G06F 1/1601* (2013.01); *A47B 97/00* (2013.01); *A61H 1/005* (2013.01); *A61H 5/00* (2013.01); *F16M 11/2092* (2013.01); *G06F 3/011* (2013.01); *G06F 3/012* (2013.01); *G06F 3/013* (2013.01); *G06F 3/0362* (2013.01); *A47B 2097/006* (2013.01); *G06F 2200/1613* (2013.01); *H02K 7/116* (2013.01)

(58) Field of Classification Search
CPC ........ G06F 1/1675; G06F 3/011; G06F 3/012; G06F 3/0304; G06F 1/1601; G06F 1/162; G06F 1/1681; G06F 2200/1612; G06F 3/013; G06F 3/0362; G06F 1/1616; G06F 1/1679; G06F 1/1683; G06F 1/16; A61H 1/005; H05K 5/0234; F16M 11/10; F16M 2200/08; F16M 11/24

USPC .......................... 361/679.21–679.22, 679.05, 361/679.26–679.27; 248/917–924

See application file for complete search history.

(56) References Cited

U.S. PATENT DOCUMENTS

| | | | |
|---|---|---|---|
| 6,288,891 B1 * | 9/2001 | Hasegawa | F16M 11/10 |
| | | | 248/923 |
| 6,887,004 B1 * | 5/2005 | Hogle | A47B 21/0314 |
| | | | 400/679 |
| 9,662,259 B1 * | 5/2017 | Nguyen | F16M 11/00 |
| 2008/0158801 A1 * | 7/2008 | Mathews | A61H 5/00 |
| | | | 361/679.07 |
| 2009/0262493 A1 * | 10/2009 | Lee | G06F 1/1601 |
| | | | 361/679.21 |

(Continued)

*Primary Examiner* — Nidhi Thaker
(74) *Attorney, Agent, or Firm* — Booth Udall Fuller, PLC

(57) ABSTRACT

An anti-accommodation paresis apparatus for a computer screen may include a controller configured to emit a control signal to drive a motor operably coupled to the controller and responsive thereto, and a computer screen support configured to couple to a computer screen, the computer screen support mechanically coupled to the motor. The motor may be configured to receive the control signal and operate to move the computer screen support closer to and farther away from a viewer of the computer screen according to an automated, predetermined pattern at a predetermined speed of movement selected to reduce accommodation paresis of the viewer.

12 Claims, 2 Drawing Sheets

(56) References Cited

U.S. PATENT DOCUMENTS

2012/0194988 A1\* 8/2012 Pan .................. F16M 11/048
                                                    361/679.26
2015/0248144 A1\* 9/2015 Hong ................ G06F 1/1675
                                                    361/679.27
2016/0302315 A1\* 10/2016 Choi ................ F16M 11/048

\* cited by examiner

ANTI-ACCOMMODATION PARESIS APPARATUS

CROSS REFERENCE TO RELATED APPLICATIONS

This is a continuation-in-part application of U.S. patent application Ser. No. 15/041,579, filed Feb. 11, 2016 and issues on May 30, 2017 as U.S. Pat. No. 9,662,259, entitled "Anti-Accommodation Paresis Apparatus" to Nguyen, the disclosure of which is hereby incorporated herein by this reference.

BACKGROUND

Technical Field

Aspects of this document relate generally to an anti-accommodation paresis apparatus, and more particularly to an apparatus that can be coupled to a computer screen to reduce accommodation paresis of a viewer.

Background

Accommodation is the ability of the eye to focus. The eye can focus very quickly under normal circumstances. For instance, the eye can view objects at different distances and accommodate or focus to allow for a vision of a sharp image. However, prolonged viewing of an object, such as a computer screen, at a fixed distance can lead to blurry vision when looking away from the object. This phenomenon is referred to as "accommodation paresis," the transient inability of the eye to focus after staring at a fixed distance. One skilled in the art is familiar with the extensive medical research into this problem. The typical remedy of accommodation paresis is that the viewer routinely takes breaks and looks at objects at different focal points. Therapy and training is known to improve accommodation paresis.

SUMMARY

According to an aspect of the disclosure, an anti-accommodation paresis apparatus for a computer screen may comprise a controller configured to emit a control signal to drive a motor operably coupled to the controller and responsive thereto, and a computer screen support configured to couple to a computer screen, the computer screen support mechanically coupled to the motor, wherein the motor is configured to receive the control signal and operate to move the computer screen support closer to and farther away from a viewer of the computer screen according to an automated, predetermined pattern at a predetermined speed of movement selected to reduce accommodation paresis of the viewer.

Particular embodiments may comprise one or more of the following. The computer screen support may be configured to receive a stand of the computer screen at a top surface of the computer screen support. A screen support base may be coupled to the computer screen support, wherein the computer screen support comprises an arm configured to be attached to the computer screen. The predetermined pattern may be moving forward and backward at the predetermined speed within a distance of travel. The predetermined speed may include a speed of between 1 and 6 inches per hour and the distance of travel is up to 6 inches. The predetermined pattern may involve moving forward and backward at a random speed within a range of 6 inches/hour-12 inches/hour. A first sensor may be coupled to the controller and configured to emit an activation signal to the controller when the first sensor senses the computer screen is in use and emit a deactivation signal to the controller when the first sensor senses the computer screen is not in use.

According to another aspect of the disclosure, an anti-accommodation paresis apparatus for a computer screen may comprise a controller configured to emit a control signal to drive a motor operably coupled to the controller and responsive thereto, and a computer screen support configured to couple to a computer screen, the computer screen support mechanically coupled to the motor, wherein the motor is configured to receive the control signal and operate to move the computer screen support closer to and farther away from a viewer of the computer screen according to an automated, predetermined pattern at a predetermined speed in a range of 6 inches/hour-12 inches/hour selected to reduce accommodation paresis of the viewer.

Particular embodiments may comprise one or more of the following. The computer screen support may be configured to receive a stand of the computer screen at a top surface of the computer screen support. A screen support base may be coupled to the computer screen support, wherein the computer screen support comprises an arm configured to be attached to the computer screen. The predetermined pattern may be moving forward and backward at the predetermined speed within a distance of travel. The predetermined speed may include a speed of between 1 and 6 inches per hour and the distance of travel is up to 6 inches. The predetermined pattern may involve moving forward and backward at a random speed within the range of 6 inches/hour-12 inches/hour. A first sensor may be coupled to the controller and configured to emit an activation signal to the controller when the first sensor senses the computer screen is in use and emit a deactivation signal to the controller when the first sensor senses the computer screen is not in use.

According to another aspect of the disclosure, a computer monitor system for reducing accommodation paresis may comprise a computer screen, and an apparatus coupled to the computer screen, comprising a controller configured to emit a control signal to drive a motor operably coupled to the controller and responsive thereto, and a computer screen support coupled to the computer screen, the computer screen support mechanically coupled to the motor, wherein the motor is configured to receive the control signal and operate to move the computer screen support closer to and farther away from a viewer of the computer screen according to an automated, predetermined pattern at a predetermined speed of movement selected to reduce accommodation paresis of the viewer.

Particular embodiments may comprise one or more of the following. A top surface of the computer screen support may receive a stand of the computer screen. A screen support base may be coupled to the computer screen support, wherein the computer screen support comprises an arm attached to the computer screen. The predetermined pattern may involve moving forward and backward within a distance of travel of between 1 to 6 inches, and the predetermined speed is up to 6 inches per hour. The predetermined pattern may involve moving forward and backward at a random speed within a range of 6 inches/hour-12 inches/hour. A first sensor may be coupled to the controller and configured to emit an activation signal to the controller when the first sensor senses the computer screen is in use and emit a deactivation signal to the controller when the first sensor senses the computer screen is not in use.

Aspects, embodiments, and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographers if desired. The inventor expressly elects, as his own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain, and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112, ¶ 6. Thus, the use of the words "function," "means," or "step" in the Detailed Description or Brief Description of the Drawings or claims is not intended to somehow indicate a desire to invoke the special provisions of 35 U.S.C. § 112, ¶ 6, to define the invention. To the contrary, if the provisions of 35 U.S.C. § 112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or act in support of the function. Thus, even when the claims recite a "means for performing the function of . . . " or "step for performing the function of . . . ," if the claims also recite any structure, material, or acts in support of that means or step, or performance of the recited function, it is the clear intention of the inventor not to invoke the provisions of 35 U.S.C. § 112, ¶ 6. Moreover, even if the provisions of 35 U.S.C. § 112, ¶ 6 are invoked to define the claimed aspects, it is intended that these aspects not be limited only to the specific structure, material, or acts that are described in the preferred embodiments, but in addition, include any and all structures, materials, or acts that perform the claimed function as described in alternative embodiments or forms of the disclosure, or that are well known present or later-developed, equivalent structures, material, or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, wherein like designations denote like elements.

DETAILED DESCRIPTION

Figure 1:
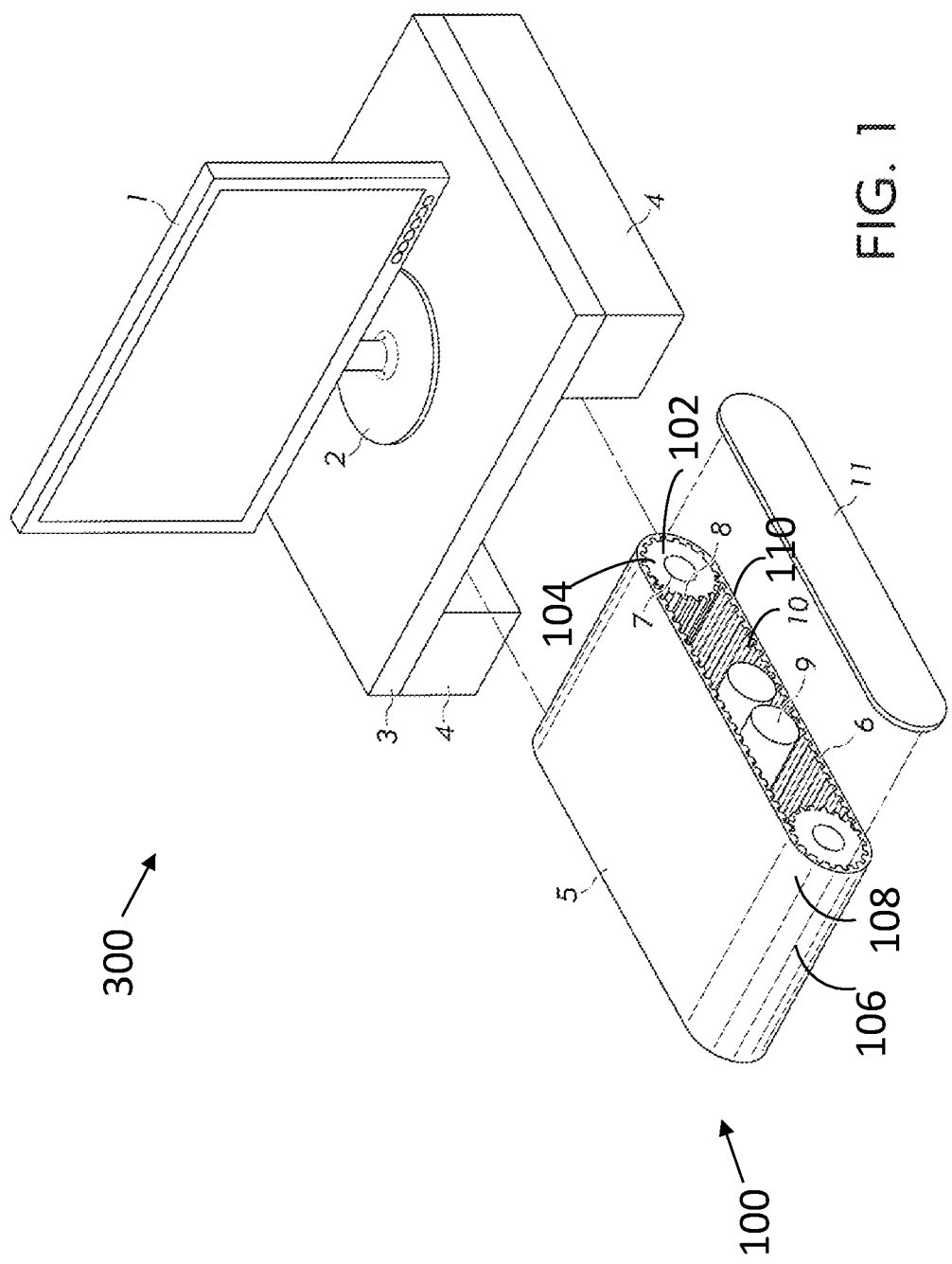
FIG. 1 shows an anti-accommodation paresis device.

The disclosure generally relates to methods and apparatus for reducing accommodation paresis of a viewer of a computer screen by moving the screen according to an automated, predetermined pattern at a predetermined speed of movement selected to reduce accommodation paresis of the viewer.

A review of pertinent medical literature shows that there is "accommodative facility training" that can increase relative accommodation, both positive and negative, to relieve paresis symptoms. The literature indicates that there is long term beneficial effect of accommodative facility training using a dioptric flip lens technique. The flip lens technique involves placing two minus lenses and two plus lenses into a holder. The user focuses through one pair of lenses at an object at near distance. When the object is clearly in focus, a flip is performed by placing the other lens into position. Repetition of this process of flipping lenses improves accommodative function.

The present disclosure relates to devices that can be used to continuously force the eye to change its focus, and constantly contract the eye muscles for accommodation while a user is performing one common activity that takes up most of many people's days—computer screen watching. As a result, the accommodation muscles are exercised to reduce accommodation paresis, eye strain, and the likelihood of blurry vision. When the computer screen constantly but slowly moves back and forth away from a viewer, the viewer's focal distance will continually change, and the viewer's eyes are not staring at a fixed distance for prolonged periods. This will cause the viewer's eyes to continually accommodate and force the accommodation muscles to continually contract. In this manner, accommodation paresis is reduced or eliminated. The distraction of a moving screen can be minimized by moving the screen at a nearly imperceptibly slow rate as not to distract the viewer. It will be clear to those of ordinary skill in the art that the principles described herein are applicable to all computer, television, and other displays that are conventionally intended for mounting in a fixed location and watched for long periods of time from a fixed location. As used herein, computer screen is intended to encompass all such displays.

An anti-accommodation paresis apparatus 100, 200 may comprise a controller 104 and a computer screen support 106 or 206. The controller 104 may be configured to emit a control signal to drive a motor 102. The motor 102 is operably coupled to the controller 104 and be responsive to the controller 104. The computer screen support 106, 206 is coupled to a computer screen 1. The computer screen 1 is, thus, mechanically coupled to the motor 102 which receives the control signal emitted from the controller 104 and operates to move the computer screen support 106 closer to and farther away from a viewer of the computer screen 1 according to an automated, predetermined pattern at a predetermined speed of movement selected to reduce accommodation paresis of the viewer.

The anti-accommodation paresis apparatus 100, 200 can be integrated into the housing of a computer monitor system 300, 400 for reducing accommodation paresis that comprises a computer screen 1 and the apparatus 100 or 200, or can be manufactured separately as merely a support for a computer monitor or screen 1. The apparatus 100, 200 can be coupled to a specific type of computer screen or universally coupled to any type of computer screens.

In some instances, a computer screen 1 may comprise a stand 2 and a platform 3 on which the screen 1 rests (FIG. 1). The computer screen support 106 can be configured to receive the platform 3. For example, in the embodiment of FIG. 1, the anti-accommodation paresis apparatus 100 can comprise a surface 5 and the platform 3, or more simply, and more directly, the stand 2 of the screen 1, can be placed on the surface 5. The platform 3 may comprise two guides 4 on opposing edges of the platform 3, or otherwise configured to engage with the computer screen support 106. For the embodiment of FIG. 1, the platform 3 is placed on the surface 5 of the computer screen support 106 with the computer screen support 106 being positioned between the guides 4 so that when the computer screen support 106 moves closer to and farther away from the user, the platform 3 and computer screen 1 move with it. Because the movement of the computer screen support 106 is not rapid or abrupt, in many embodiments the computer screen 1 and its stand 2 will be placed directly on the computer screen support 106.

The anti-accommodation paresis apparatus 100 may comprise a housing 108 that comprises the surface 5 in the form of a track 6, an inner surface 110, and a cover 11. A cover 11 can be used to protect a viewer from being injured by moving parts, and to block dust or other objects from entering into the moving parts and interfering with the operation of the apparatus.

The computer screen support 106 is configured to move a pre-set distance or distance of travel on the surface through the track 6 engaging with the drive wheel or drive gear 7. The drive wheel in the embodiment of FIG. 1 includes cogs or teeth that engage the cogs or teeth 10 in the inner surface 110. At least one free turning wheel or free wheel 9 may be located on and fitted into the track 6 for maintaining the definition or shape of the track 6 and allowing for distribution of load. The free wheels 9 can be all engaged to turn by a single drive wheel 7, which can be connected to and driven by a motor 102. A controller 104 within the motor 102 sends signals to and controls the drive gear 7 to indicate its direction and speed of rotation at particular times during its operation.

In a particular embodiment, the platform may be coupled to a stationary base through a slide or guide rails that guide the backward and forward movement of the platform. Similar to the previous embodiments, a motor and wheel may be fixed to the base of the anti-accommodation paresis apparatus on a side of or beneath the platform. The wheel may be in contact with the under-side of the platform, or the wheel may directly engage the guide-rails which are coupled to the platform. When the wheel coupled to the motor in the base turns it drives the platform back and forth along the direction as determined by slides or rails. The platform will move backward and forward in relation to the base. When the motor reverses directions, the platform will return along its path.

Figure 2:
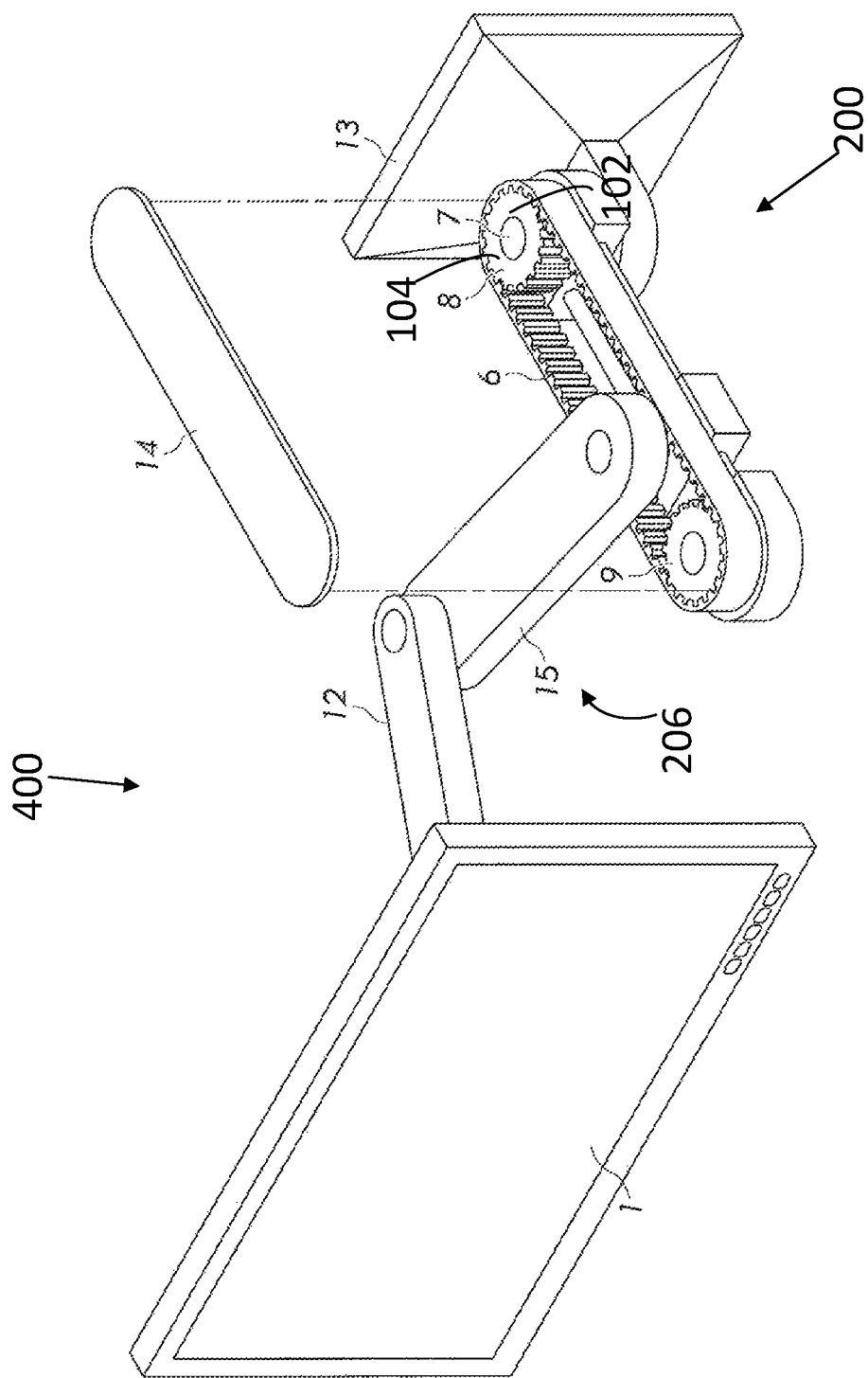
FIG. 2 shows another anti-accommodation paresis device.

In the specific embodiment of FIG. 2 and other embodiments, the anti-accommodation paresis apparatus 200 may comprise a controller 104 and a computer screen support 206 that comprises an arm 12. The anti-accommodation paresis apparatus 200 can further comprise a wall mount or other fixed support 13 coupled to the computer screen support 206. The arm 12 is configured to be attached to the computer screen 1, and in some embodiments pivotally attached to the computer screen 1. The arm 12 may further comprise one or two more middle arms 15 so that the arm 12 can fold and keep the movement of the screen 1 in the direction of forward and backward relative to the viewer or the arm can swing to allow the viewer to access the screen at different locations and still allow for the forward and backward movement. In particular embodiments, the junction between the arm 12 and the one or two middle arms 15 may also be geared so that the angle of the screen 1 changes as the middle arm 15 is moved forward and backward, to enable the screen 1 to move closer to and farther away from the viewer even when the screen is angled to one side or the other.

In this particular embodiment, the arm 12 is coupled to a wheel and track assembly, which is driven and controlled by the controller 104 and the motor 102. The wheel and track assembly can comprise a drive wheel 7 and at least one free turning wheel 9. The arm 12 or the middle arms 15 can be fixedly coupled to one side of the track 6. The drive wheel 7 can have cogs or teeth that engage the cogs or teeth in the track 6 so that the drive wheel 7 drives the movement of the track 6, the arm 12, and the computer screen support 206. A cover 14 may be used to cover the wheel and track assembly for purposes of safety (to avoid nip points) and for blocking dusts or other objects from entering into the wheel and track assembly and interfering with its operation.

To limit tipping, the fixed support 13 can be clamped or affixed to a wall, an object, or a surface, or the fixed support 13 can have a weight inside to counter-balance the weight of the screen 1 and the rest of the apparatus 200 so that the fixed support 13 can be placed on a surface, such as the top of a desk.

The anti-accommodation paresis apparatus 100, 200 comprises a power source connection. The power source connection may be connected to the computer, an outlet on the wall, a stand-alone power source, or a power source within the apparatus.

In particular embodiments, the anti-accommodation paresis apparatus 100, 200 is operated by an on-off switch (not shown) to allow the user to selectively activate or deactivate the anti-accommodation paresis apparatus which continues its movement according to a predetermined pattern until it is turned off. In other embodiments, the anti-accommodation paresis apparatus 100, 200 may further comprise a first sensor 8. The first sensor 8 can be placed on the drive wheel 7 and be coupled to the controller 104. A computer use sensor may be plugged into the computer through a USB connection to detect when the computer is in use. Power is automatically sent to the anti-accommodation paresis apparatus, turning its circuits on. Additional power may be supplied to the anti-accommodation paresis apparatus through another source for powering the drive wheel and controller.

The first sensor 8 can emit an activation signal to the controller 104 when it detects that the computer screen 1 is in use. Once the activation signal is received, the controller 104 emits a control signal to the motor 102 to start or continue the process of movement. When the first sensor 8 detects the computer screen 1 is not in use, the first sensor 8 can emit a deactivation signal to the controller 104, or stop emitting the activation signal, and the controller 104 emits a control signal to the motor 102 to halt the motor 102 and the movement of the screen 1.

The apparatus 100, 200 may further comprise a second sensor which may be placed on the drive wheel 7. The second sensor is configured to sense whether the computer screen 1 has reached the end of its permitted travel or distance of travel. For example, the second sensor can sense whether the computer screen support 106, 206 has reached the end of its distance of travel either toward or away from the viewer. If the computer screen support 106, 206 has reached the end, the controller 104 can send a reverse signal to the motor 102 and reverse the travel direction of the computer screen support 106, 206, and therefore reverse the travel direction of the screen 1.

The screen 1 may be configured to move slowly enough so that the viewer is not consciously aware of the motion without particular attention being paid to the movement. The computer screen may be configured to move backward and forward, and/or in other patterns that can be used to reduce accommodation paresis. The distance of travel, the speed of movement over that distance, and/or the time to complete that distance of travel can be pre-set or customized by the viewer through a direct or wireless interface. In particular embodiments, the distance of travel of the screen 1 is set to a maximum of six inches. The predetermined speed of movement may be set to 6 inches per hour or can be within a range, such as 6 inches per hour to 12 inches per hour, with the controller adjusting the speed of movement within that range. In some instances, the predetermined speed of movement may be set to a randomized fixed or adjusted speed within the range of 6 inches per hour to 12 inches per hour. Alternatively, the settings may be configured to allow a user a choice for how much time to use to complete one cycle of forward and backward translation of the screen. This distance and speed can be changed to optimize the anti-accommodation paresis effects of the apparatus and minimize the distractive effect of the motion.

In some embodiments, the computer screen support may comprise two or more pulleys connected by straps, where tension of the straps can be increased or decreased to allow for movement of the computer screen 1. In some embodiments, the computer screen support may comprise, and be moved by, a spring that can be slowly recoiled by pressure and then expanded. In some instances, the computer screen support can comprise, be moved by, a piston that can be slowly compressed pneumatically and then released.

The words "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments of many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

It will be understood that the embodiments disclosed are not limited to the specific components disclosed herein, as virtually any components consistent with the intended operation of a method and/or system implementation for such an embodiment may be used. Accordingly, for example, although particular component examples may be disclosed, such components may be comprised of any shape, size, style, type, model, version, class, grade, measurement, concentration, material, weight, quantity, and/or the like consistent with the intended purpose, method and/or system of implementation.

In places where the description above refers to particular implementations or embodiments, it should be readily apparent that a number of modifications may be made without departing from the scope and/or spirit thereof and that these principles and modifications may be applied to other such embodiments. The presently disclosed embodiments are, therefore, to be considered in all respects as illustrative and not restrictive. The present disclosure is to be considered as an exemplification of the principles of the disclosed methods, apparatus, and systems. The presently-disclosed implementations are, therefore, to be considered in all respects as illustrative, and not intended to limit the broad aspect of the disclosed concepts to the embodiments illustrated. Many additional components and manufacturing and assembly procedures known in the art or consistent with an anti-accommodation apparatus are contemplated for use with particular implementations in this disclosure. For example, although particular implementations are disclosed, such implementations and implementing components may comprise any components, models, types, materials, versions, quantities, and/or the like as is known in the art for such systems and implementing components, consistent with the intended operation. In places where the description above refers to particular implementations of anti-accommodation apparatus, it should be readily apparent that a number of modifications may be made without departing from the spirit thereof. All changes that come within the meaning of and range of equivalency of the description are intended to be embraced therein.

The invention claimed is:

1. An anti-accommodation paresis apparatus for a computer screen, the apparatus comprising:
a controller configured to emit a control signal to drive a motor operably coupled to the controller and responsive thereto; and
a computer screen support configured to couple to the computer screen, the computer screen support mechanically coupled to the motor;
wherein the motor is configured to receive the control signal and operate to continuously move the computer screen support closer to and farther away from a viewer of the computer screen according to an automated, predetermined pattern at a predetermined speed of movement selected to reduce accommodation paresis of the viewer; and
wherein the predetermined speed is a speed of between 1 and 6 inches per hour, or the predetermined pattern is moving forward and backward at a random speed within a range of 6 inches/hour to 12 inches/hour.

2. The apparatus of claim 1, wherein the computer screen support is configured to receive a stand of the computer screen at a top surface of the computer screen support.

3. The apparatus of claim 1, further comprising a screen support base coupled to the computer screen support, wherein the computer screen support comprises an arm configured to be attached to the computer screen.

4. The apparatus of claim 1, further comprising a first sensor coupled to the controller and configured to emit an activation signal to the controller when the first sensor senses the computer screen is in use and emit a deactivation signal to the controller when the first sensor senses the computer screen is not in use.

5. An anti-accommodation paresis apparatus for a computer screen, the apparatus comprising: a controller configured to emit a control signal to drive a motor operably coupled to the controller and responsive thereto; and a computer screen support configured to couple to the computer screen, the computer screen support mechanically coupled to the motor; wherein the motor is configured to receive the control signal and operate to move the computer screen support closer to and farther away from a viewer of the computer screen according to an automated, predetermined pattern at a predetermined speed in a range of 1 inches/hour and 12 inches/hour selected to reduce accommodation paresis of the viewer; wherein the predetermined pattern is moving forward and backward at the predetermined speed between 1 and 6 inches per hour within a distance of travel up to 6 inches; and wherein the motor is further configured to operate to continuously move the computer screen support closer to and farther away from the viewer of the computer screen so that the viewer's focal distance will continually change and the viewer's accommodation muscles will continually contract.

6. The apparatus of claim 5, wherein the computer screen support is configured to receive a stand of the computer screen at a top surface of the computer screen support.

7. The apparatus of claim 5, further comprising a screen support base coupled to the computer screen support, wherein the computer screen support comprises an arm configured to be attached to the computer screen.

8. The apparatus of claim 5, further comprising a first sensor coupled to the controller and configured to emit an activation signal to the controller when the first sensor senses the computer screen is in use and emit a deactivation signal to the controller when the first sensor senses the computer screen is not in use.

9. A computer monitor system for reducing accommodation paresis, comprising: a computer screen; and an apparatus coupled to the computer screen, comprising: a controller configured to emit a control signal to drive a motor operably coupled to the controller and responsive thereto; and a computer screen support coupled to the computer screen, the computer screen support mechanically coupled to the motor; wherein the motor is configured to receive the control signal and operate to move the computer screen support closer to and farther away from a viewer of the computer screen according to an automated, predetermined pattern at a predetermined speed of movement selected to reduce accommodation paresis of the viewer; and wherein the predetermined pattern is moving forward and backward within a distance of travel of between 1 to 6 inches, and the predetermined speed is up to 6 inches per hour, or the predetermined pattern is moving forward and backward at a random speed within a range of 6 inches/hour and 12 inches/hour; wherein the motor is further configured to operate to continuously move the computer screen support closer to and farther away from the viewer of the computer screen so that the viewer's focal distance will continually change and the viewer's accommodation muscles will continually contract.

10. The computer monitor system of claim 9, wherein a top surface of the computer screen support receives a stand of the computer screen.

11. The computer monitor system of claim 9, further comprising a screen support base coupled to the computer screen support, wherein the computer screen support comprises an arm attached to the computer screen.

12. The computer monitor system of claim 9, further comprising a first sensor coupled to the controller and configured to emit an activation signal to the controller when the first sensor senses the computer screen is in use and emit a deactivation signal to the controller when the first sensor senses the computer screen is not in use.

* * * * *